(12) United States Patent
Zhang et al.

(10) Patent No.: US 12,473,001 B2
(45) Date of Patent: Nov. 18, 2025

(54) ANTI-COLLISION METHOD AND APPARATUS FOR TRAINS IN COOPERATIVE FORMATION

(71) Applicant: Traffic Control Technology Co., Ltd, Beijing (CN)

(72) Inventors: Qiang Zhang, Beijing (CN); Junguo Sun, Beijing (CN); Yilong Wen, Beijing (CN)

(73) Assignee: Traffic Control Technology Co., Ltd, Beijing (CN)

( * ) Notice: Subject to any disclaimer, the term of this patent is extended or adjusted under 35 U.S.C. 154(b) by 868 days.

(21) Appl. No.: 17/774,491

(22) PCT Filed: Jan. 22, 2020

(86) PCT No.: PCT/CN2020/073724
§ 371 (c)(1),
(2) Date: May 5, 2022

(87) PCT Pub. No.: WO2021/134855
PCT Pub. Date: Jul. 8, 2021

(65) Prior Publication Data
US 2022/0388555 A1 Dec. 8, 2022

(30) Foreign Application Priority Data
Dec. 30, 2019 (CN) .......................... 201911404109.0

(51) Int. Cl.
*B61L 27/04* (2006.01)
*B60T 8/32* (2006.01)
(Continued)

(52) U.S. Cl.
CPC ............ *B61L 27/04* (2013.01); *B60T 8/3235* (2013.01); *B61H 11/00* (2013.01);
(Continued)

(58) Field of Classification Search
CPC .. B61L 27/04; B61L 15/0018; B61L 15/0027; B61L 15/0058; B61L 15/0072;
(Continued)

(56) References Cited

U.S. PATENT DOCUMENTS 6,580,976 B1 * 6/2003 Belcea ..................... B61L 27/20
340/988
9,139,210 B2 * 9/2015 Ning ....................... B61L 27/20
(Continued)

FOREIGN PATENT DOCUMENTS

| CN | 102616235 A | 8/2012 |
| CN | 103072593 A | 5/2013 |

(Continued)

OTHER PUBLICATIONS

The International search report for PCT Application No. PCT/CN2020/073724, dated Sep. 24, 2020, 8 pages.
(Continued)

*Primary Examiner* — Zachary L Kuhfuss
(74) *Attorney, Agent, or Firm* — East IP P.C.

(57) ABSTRACT

The embodiments of the present application disclose an anti-collision method and apparatus for trains in a cooperative formation. The anti-collision method includes: determining whether it is necessary to control the current train to brake; determining whether a real-time distance between the current train and a previous adjacent train in the same formation as the current train is greater than a preset minimum safety distance; controlling, under a condition that the real-time distance is less than the preset minimum safety distance, the current train to perform electromagnetic braking; and calculating, under a condition that the real-time distance is greater than the preset minimum safety distance, a real-time safety distance between the current train and the previous adjacent train, and controlling, under a condition that the real-time distance is less than the real-time safety distance, the current train to brake.

8 Claims, 3 Drawing Sheets

(51) Int. Cl.
    *B61H 11/00*     (2006.01)
    *B61L 15/00*     (2006.01)
    *B61L 23/34*     (2006.01)
    *B61L 25/02*     (2006.01)
    *B61L 27/20*     (2022.01)

(52) U.S. Cl.
    CPC ....... *B61L 15/0018* (2013.01); *B61L 15/0058* (2024.01); *B61L 15/0062* (2024.01); *B61L 15/0081* (2013.01); *B61L 23/34* (2013.01); *B61L 25/021* (2013.01); *B61L 25/025* (2013.01); *B61L 27/20* (2022.01); *B61L 2027/204* (2022.01)

(58) Field of Classification Search
    CPC .. B61L 15/0062; B61L 15/0081; B61L 23/34; B61L 25/021; B61L 25/025; B61L 27/20; B61L 27/70; B61L 2027/204; B61L 2201/00; B61L 21/10; B61L 27/00; B60T 8/3235; B60T 8/1705; B60T 17/228; B60T 13/665; B61H 11/00
    USPC .............. 701/19, 20, 301; 246/182 B, 122 R
    See application file for complete search history.

(56) References Cited

U.S. PATENT DOCUMENTS

| | | | | |
|---|---|---|---|---|
| 2011/0172856 | A1* | 7/2011 | Kull | B61L 15/0027 246/219 |
| 2012/0245770 | A1* | 9/2012 | Yamamoto | B61L 15/0062 701/20 |
| 2013/0218375 | A1* | 8/2013 | Ning | B61L 27/00 701/19 |
| 2015/0307119 | A1* | 10/2015 | Ghaly | B61L 25/06 246/122 R |
| 2016/0046308 | A1* | 2/2016 | Chung | B61L 27/04 701/20 |
| 2017/0210404 | A1* | 7/2017 | Brooks | B61L 15/0009 |

FOREIGN PATENT DOCUMENTS

| | | |
|---|---|---|
| CN | 105313891 A | 2/2016 |
| CN | 105679093 A | 6/2016 |
| CN | 105730442 A | 7/2016 |
| CN | 106114422 B | 6/2017 |
| CN | 107128302 A | 9/2017 |
| CN | 108765926 A | 11/2018 |
| CN | 110395300 A | 11/2019 |
| CN | 110435623 A | 11/2019 |
| CN | 110588723 A | 12/2019 |
| EP | 347 3522 A1 | 4/2019 |
| FR | 3026710 A1 | 4/2016 |
| WO | 2010060797 A1 | 6/2010 |
| WO | 2015019430 A1 | 2/2015 |

OTHER PUBLICATIONS

The First Office Action for Chinese Application No. 201911404109.0, dated Aug. 4, 2020, 26 pages.
Lin Junting et al. Design and research of the improved train control system with collision avoidance system for urban mass transit. Journal of Railway Science and Engineering.May 14, 2015(May 14, 2015) The second issue, 7 pages.
The extended European search report for European Application No. 20909048.9, dated Oct. 24, 2023, 9 pages.

* cited by examiner

Fig. 7

ANTI-COLLISION METHOD AND APPARATUS FOR TRAINS IN COOPERATIVE FORMATION

CROSS REFERENCE TO RELATED APPLICATION

The present application is a National Stage of International Application No. PCT/CN2020/073724, filed on Jan. 22, 2020, which claims the benefit of priority to Chinese Patent Application No. 2019114041090 filed on Dec. 30, 2019 and titled "ANTI-COLLISION METHOD AND APPARATUS FOR TRAINS IN COOPERATIVE FORMATION", both of which are incorporated herein by reference in their entireties.

TECHNICAL FIELD

The present application relates to the technical field of rail transit, and particularly to an anti-collision method and apparatus for trains in a cooperative formation.

BACKGROUND

With the continuous development of rail transit technology, more and more operators adopt the operation scheme of collaborative formation to improve the operation capability, in which the trains in the formation can track adjacent trains and travel in sequence. In order to ensure the operation capability, it is particularly important to avoid train collision and reduce train rear-end collision.

At present, the urban rail transit control system generally uses the Automatic Train Protection (ATP, a train automatic protection system) to prevent the trains in the formation from colliding. Specifically, the ATP can calculate, according to information such as the position of the current train, the line mark information of the current line and the delay in establishing an emergency braking of the current train, the upper speed limit and the speed limit line allowed for the current train, and send the upper speed limit and the speed limit line to the current train. Then, the current train can compare the actual speed with the upper speed limit and brake when the actual speed is greater than the upper speed limit, so that the current train can complete the braking before the speed limit line to maintain a safety distance from the previous train, so as to avoid collision.

In the prior art, when calculating the upper speed limit, the ATP determines the upper speed limit and the speed limit line according to the line mark, however, the line mark cannot accurately represent the real position of the previous train, therefore the calculated upper speed limit and speed limit line are not optimal and the distances between the trains in the formation are usually large, the operation capability cannot be further improved.

SUMMARY

For the above problems in the prior art, the present application provides an anti-collision method and apparatus for trains in a cooperative formation.

In a first aspect, the embodiments of the present application provides an anti-collision method for trains in a cooperative formation, including:

determining, under a condition that a current train is not a first train in the formation, whether it is necessary to control the current train to brake;

determining, under a condition that it is necessary to control the current train to brake, whether a real-time distance between the current train and a previous adjacent train in the same formation as the current train is greater than a preset minimum safety distance;

controlling, under a condition that the real-time distance is less than the preset minimum safety distance, the current train to perform electromagnetic braking; and calculating, under a condition that the real-time distance is greater than the preset minimum safety distance, a real-time safety distance between the current train and the previous adjacent train, and controlling, under a condition that the real-time distance is less than the real-time safety distance, the current train to brake.

Optionally, the determining whether it is necessary to control the current train to brake includes:

under a condition that the previous adjacent train in the same formation as the current train brakes urgently, determining that it is necessary to control the current train to brake; or under a condition that the real-time distance between the current train and the previous adjacent train in the same formation as the current train determined by ranging is less than a first preset maximum safety distance, determining that it is necessary to control the current train to brake.

Optionally, the real-time distance between the current train and the previous adjacent train in the same formation as the current train determined by ranging is determined by:

obtaining real-time operation information of the previous adjacent train, wherein the real-time operation information comprises at least a speed of the previous adjacent train and position information of the previous adjacent train;

calculating, based on the position information of the previous adjacent train in the real-time operation information and position information of the current train, the real-time distance between the current train and the previous adjacent train; or measuring the real-time distance between the current train and the previous adjacent train, wherein a method for measuring the real-time distance comprises at least one or both of laser radar and ultra wide band technology.

Optionally, the controlling the current train to perform electromagnetic braking includes:

sending a message for performing electromagnetic braking to the previous adjacent train, so that the previous adjacent train energizes an electromagnet at a rear of the previous adjacent train; and energizing an electromagnet at a front of the current train, so that the electromagnet at the front of the current train and the electromagnet at the rear of the previous adjacent train generate magnetic fields with a same polarity to control the current train to perform electromagnetic braking.

Optionally, the controlling the current train to brake includes:

obtaining a braking acceleration of the previous adjacent train, determining a target braking acceleration of the current train based on the braking acceleration and a preset braking acceleration increase, and controlling the current train to brake according to the target braking acceleration.

Optionally, the calculating the real-time safety distance between the current train and the previous adjacent train includes:

under a condition that the real-time distance is less than a second preset maximum safety distance, measuring a relative speed between the current train and the previous adjacent train, and calculating the real-time safety distance based on the relative speed; and under a condition that the real-time distance is greater than the second preset maximum safety distance, calculating the real-time safety distance based on the speed of the previous adjacent train in the real-time operation information, a speed of the current train and a communication delay.

In a second aspect, the embodiments of the present application further provides an anti-collision apparatus for trains in a cooperative formation, including a sensor measuring module, a data communication module, a control algorithm module and an anti-collision execution module, wherein:

the sensor measuring module is configured to measure a real-time distance between a current train and a previous adjacent train in the same formation as the current train; the data communication module is configured to implement real-time communication between the previous adjacent train and the current train;

the control algorithm module is configured to determine whether it is necessary to control the current train to brake; determine whether the real-time distance between the current train and the previous adjacent train in the same formation as the current train is greater than a preset minimum safety distance; and calculate a real-time safety distance between the current train and the previous adjacent train; and the anti-collision execution module is configured to control the current train to perform electromagnetic braking; or control, under a condition that the real-time distance is less than the real-time safety distance, the current train to brake.

Optionally, the control algorithm module is further configured to:

under a condition that the previous adjacent train in the same formation as the current train brakes urgently, determine that it is necessary to control the current train to brake; or under a condition that the real-time distance between the current train and the previous adjacent train in the same formation as the current train determined by ranging is less than a first preset maximum safety distance, determine that it is necessary to control the current train to brake.

Optionally, the data communication module is further configured to:

obtain real-time operation information of the previous adjacent train, wherein the real-time operation information comprises at least a speed of the previous adjacent train and position information of the previous adjacent train;

the control algorithm module is further configured to:

calculate, based on the position information of the previous adjacent train in the real-time operation information and position information of the current train, the real-time distance between the current train and the previous adjacent train; or the sensor measuring module is further configured to:

measure the real-time distance between the current train and the previous adjacent train, wherein a method for measuring the real-time distance comprises at least one or both of laser radar and ultra wide band technology.

Optionally, the anti-collision execution module comprises an electromagnetic anti-collision component configured to:

send a message for performing electromagnetic braking to the previous adjacent train, so that the previous adjacent train energizes an electromagnet at a rear of the previous adjacent train; and energize an electromagnet at a front of the current train, so that the electromagnet at the front of the current train and the electromagnet at the rear of the previous adjacent train generate magnetic fields with a same polarity to control the current train to perform electromagnetic braking.

Optionally, the data communication module is further configured to:

obtain a braking acceleration of the previous adjacent train;

the anti-collision execution module further comprises a short-distance algorithm control component configured to:

determine a target braking acceleration of the current train based on the braking acceleration and a preset braking acceleration increase, and control the current train to brake according to the target braking acceleration.

Optionally, the control algorithm module is further configured to:

under a condition that the real-time distance is less than a second preset maximum safety distance, measure a relative speed between the current train and the previous adjacent train, and calculate the real-time safety distance based on the relative speed; and under a condition that the real-time distance is greater than the second preset maximum safety distance, calculate the real-time safety distance based on the speed of the previous adjacent train in the real-time operation information, a speed of the current train and a communication delay.

In a third aspect, the embodiments of the present application further provides an electronic device including:

at least one processor; and at least one memory communicatively coupled to the processor, wherein:

the memory stores program instructions executable by the processor, and the processor, when executing the program instructions, implements the above method.

In a fourth aspect, the embodiments of the present application further provides a non-transitory computer-readable storage medium storing a computer program thereon, the computer program causes a computer to implement the above method.

BRIEF DESCRIPTION OF THE DRAWINGS

In order to more clearly illustrate the technical solutions of the embodiments of the present application or the prior art, the drawings needed in the description of the embodiments or the prior art will be briefly introduced in the following. Obviously, the drawings in the following description are merely some embodiments of the present application, and for those of ordinary skill in the art, other drawings can be obtained based on these drawings without creative work.

DETAILED DESCRIPTION

The specific embodiments of the present application will be further described below with reference to the accompanying drawings. The following embodiments are only used to more clearly illustrate the technical solutions of the present application, but should not be used to limit the scope of the present application.

The embodiments of the present application implement collision avoidance for trains in a cooperative formation, in which each train in the cooperative formation is provided with an anti-collision apparatus. The anti-collision apparatus may include a sensor measuring module, a data communication module, a control algorithm module and an anti-collision execution module. The sensor measuring module can measure the distance between a current train and a previous adjacent train in real-time through multi-devices redundancy such as laser radar, Ultra Wide Band (UWB) (for example, the UWB device may be set as a hot backup and perform the measurement when the laser radar device fails), and measure a relative speed between the current train and the previous adjacent train through, for example, millimeter wave radar; the data communication module can implement real-time bidirectional communication between the previous adjacent train and the current train through multi-methods redundancy such as the 5th generation mobile networks (5G), Light Fidelity (LiFi, optical fidelity technology) and image recognition, to exchange speed, acceleration, position, emergency braking and other information of the trains; the control algorithm module mainly includes a cooperative formation main control component through which the protection and distance control strategy can be determined according to the data of the sensor measuring module and the data communication module; and the anti-collision execution module may include a short-distance algorithm control component and an electromagnetic anti-collision component and can determine, according to the anti-collision strategy determined by the cooperative formation main control component, whether the short-range algorithm control component or the electromagnetic anti-collision component to specifically implement the anti-collision strategy, so as to ensure a safety distance between the trains to prevent train collision.

Figure 1:
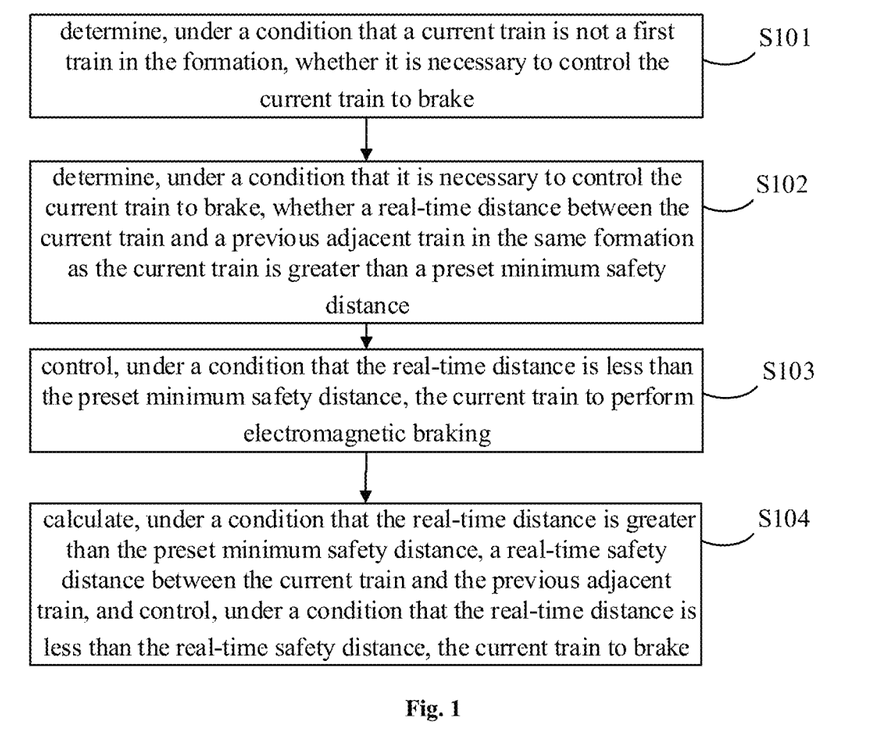
FIG. 1 shows a schematic flow diagram of an anti-collision method for trains in a cooperative formation provided by an embodiment of the present application.

FIG. 1 shows a schematic flow diagram of an anti-collision method for trains in a cooperative formation provided by an embodiment of the present application, including the following steps.

Step S101: determining, under a condition that a current train is not a first train in the formation, whether it is necessary to control the current train to brake.

Herein, the current train refers to any train in the formation.

In the implementation, in order to improve the operation capability, operators usually combine a plurality of trains into a formation, in which the trains can track adjacent trains and travel in sequence. Moreover, each train can be provided with an anti-collision apparatus, so that the train can communicate with the previous train through the data communication module in the anti-collision apparatus and exchange speed, acceleration, position, emergency braking and other information of the trains, and monitor information such as the distance, relative speed and safe tracking distance related to the previous train, so as to execute different anti-collision strategies according to the emergency braking scenario of the previous adjacent train and different distances between the trains, for example, an emergency braking, a braking, and an electromagnetic braking, etc. Specifically, first, the anti-collision apparatus on the current train can determine, through the control algorithm module, whether the current train is the first train in the current formation. Then, if the current train is not the first train in the current formation, it can be determined whether it is necessary to control the current train to brake.

Step S102: determining, under a condition that it is necessary to control the current train to brake, whether a real-time distance between the current train and a previous adjacent train in the same formation as the current train is greater than a preset minimum safety distance.

The previous adjacent train refers to a train that belongs to the same formation as the current train and travels ahead of the current train in the travel direction of the current train.

Herein, the preset minimum safety distance is a fixed distance preset according to the effective distance of electromagnetic braking, that is, if the real-time distance is greater than the preset minimum safety distance, a braking may be performed to avoid collision, and if the real-time distance is less than the preset minimum safety distance, an electromagnetic braking needs to be performed to avoid collision. For example, if the effective distance of electromagnetic braking is 10 meters, the preset distance can be set as 10 meters.

In the implementation, under a condition that it is necessary to control the current train to brake, the real-time distance between the current train and the previous adjacent train may be measured in real-time. Then, it may be determined whether the real-time distance is greater than the preset minimum safety distance, so as to determine whether to perform an electromagnetic braking or a braking for the current train.

Step S103: controlling, under a condition that the real-time distance is less than the preset minimum safety distance, the current train to perform electromagnetic braking.

In the implementation, considering that when the real-time distance is less than the preset minimum safety distance, performing a braking for the current train may not be able to effectively prevent the trains from colliding, an electromagnetic braking may be performed when the real-time distance is less than the preset minimum safety distance. Specifically, when it is determined that the real-time distance between the current train and the previous adjacent train is less than the preset minimum safety distance, the current train may be controlled to perform electromagnetic braking, so that the current train can complete the braking in a short period of time.

Step S104: calculating, under a condition that the real-time distance is greater than the preset minimum safety distance, a real-time safety distance between the current train and the previous adjacent train, and controlling, under a condition that the real-time distance is less than the real-time safety distance, the current train to brake.

Herein, the real-time safety distance refers to the minimum distance calculated in real time that should be maintained at the current moment between the current train and the previous adjacent train.

In the implementation, when the real-time distance between the current train and the previous adjacent train is greater than the preset minimum safety distance, the real-time safety distance that the current train and the previous adjacent train should maintain under the current operating conditions may be calculated in real-time. Then, the real-time safety distance may be compared with the real-time distance between the current train and the previous adjacent train, and if the real-time distance between the current train and the previous adjacent train is less than the real-time safety distance, a braking may be performed for the current train to avoid collision with the previous adjacent train. For example, the current train may be controlled to brake by the short-distance algorithm control component of the anti-collision execution module in the anti-collision apparatus, so as to avoid collision with the previous adjacent train.

From the above technical solutions, the embodiments of the present application adopt different braking manners based on different real-time distances between the current train and the previous adjacent train in the same formation. In this way, operation information of the trains can be shared in real-time based on the real-time communication between the trains, so that the obtained real-time operation information of the previous adjacent train and the current train is more accurate, and the calculated real-time distance and real-time safety distance are better and the distance between the trains can be shortened to a certain extent, the operation capability is improved. Moreover, different braking manners are adopted according to the different real-time distances between the trains, train collision can be effectively prevented while the distance between the trains is shortened, and the operation capability is further improved.

Further, on the basis of the above method embodiments, a braking may be performed if the previous adjacent train brakes urgently or the real-time distance is less than a first preset maximum safety distance, and correspondingly, a part of the process of the above step S101 may be as follows: under a condition that the previous adjacent train in the same formation as the current train brakes urgently, determining that it is necessary to control the current train to brake; or under a condition that the real-time distance between the current train and the previous adjacent train in the same formation as the current train determined by ranging is less than a first preset maximum safety distance, determining that it is necessary to control the current train to brake.

Herein, the first preset maximum safety distance refers to the preset maximum distance for which the current train needs to be controlled to brake, that is, when the real-time distance between the trains is less than the first preset maximum safety distance, it is considered that it is necessary to control the current train to brake, otherwise, it is not necessary to control the current train to brake.

Figure 2:
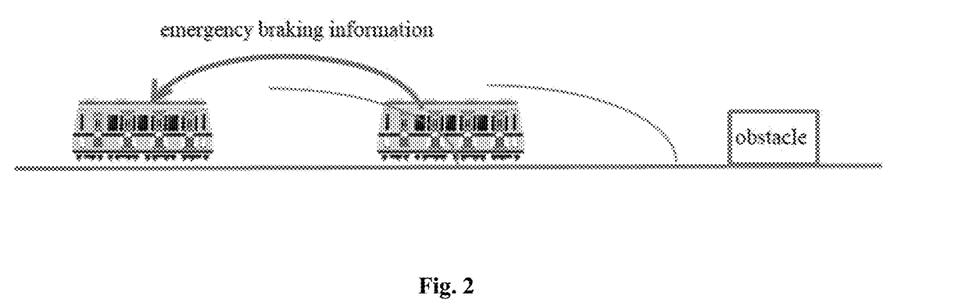
FIG. 2 shows a schematic diagram of an emergency braking of a previous adjacent train provided by an embodiment of the present application.

In the implementation, whether it is necessary to control the current train to brake may be determined by determining whether the previous adjacent train brakes urgently or whether the real-time distance between the current train and the previous adjacent train is less than the first preset maximum safety distance. Specifically, under a condition that the previous adjacent train in the same formation as the current train brakes urgently, it is determined that it is necessary to control the current train to brake. Referring to FIG. 2, for example, there is an obstacle in front of the previous adjacent train (i.e., the train on the right in FIG. 2), and in such a case, the previous adjacent train will perform emergency braking and may send emergency braking information to the current train (i.e., the train on the left in FIG. 2) to control the current train to brake. It may be understood that the emergency braking information of the previous adjacent train may be sent by the previous adjacent train, or may be perceived through images, radar, etc. Alternatively, the real-time distance between the current train and the previous adjacent train in the same formation may be determined by ranging, and it is determined whether the real-time distance is less than the first preset maximum safety distance, so as to determine whether it is necessary to control the current train to brake. In this way, the current train is controlled to brake under a condition that the previous adjacent train brakes urgently or the real-time distance is less than the first preset maximum safety distance, which can further avoid train collision and reduce train rear-end collision, and further improve the operation capability.

Further, on the basis of the above method embodiments, the real-time distance between the current train and the previous adjacent train may be measured through different methods, and correspondingly, the process may be as follows: obtaining real-time operation information of the previous adjacent train; calculating, based on the position information of the previous adjacent train in the real-time operation information and position information of the current train, the real-time distance between the current train and the previous adjacent train; or measuring the real-time distance between the current train and the previous adjacent train.

Herein, the real-time operation information includes at least a speed of the previous adjacent train and position information of the previous adjacent train.

The method for measuring the real-time distance includes at least one or both of laser radar and ultra wide band technology.

In the implementation, in determining whether to control the current train to brake, the real-time distance between the current train and the previous adjacent train may be determined first through ranging. The real-time distance may be determined according to the position information of the current train and the previous adjacent train. Specifically, first, the real-time operation information of the previous adjacent train, such as the speed and position information of the previous adjacent train, may be obtained through, for example, 5G, LiFi and image recognition technology. Then, the speed of the current train may be determined, and the real-time distance between the current train and the previous adjacent train at the current moment may be calculated based on the position information of the previous adjacent train in the real-time operation information and the position information of the current train. Alternatively, the real-time distance may be measured by the sensor measuring module in the anti-collision apparatus using one of laser radar and ultra wide band technology, or the UWB device may be set as a hot backup and perform the measurement when the laser radar device fails. In this way, with the real-time communication between the trains, information are shared to more accurately calculate, based on the real-time information of the trains, the real-time distance between the current train and the previous adjacent train; alternatively, the real-time distance between the current train and the previous adjacent train may be more accurately measured through the sensor measuring module; as such, based on the more accurate real-time distance, the optimal braking timing and braking manner can be determined, so that the distance between the trains can be shortened to a certain extent and train collision can be more effectively avoided, the operation capability is further improved.

Figure 3:
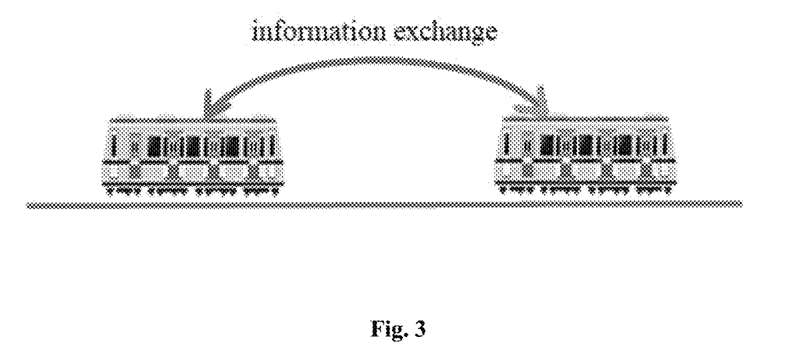
FIG. 3 shows a schematic diagram of information exchange between trains during an inter-station high-speed operation provided by an embodiment of the present application.
Figure 4:
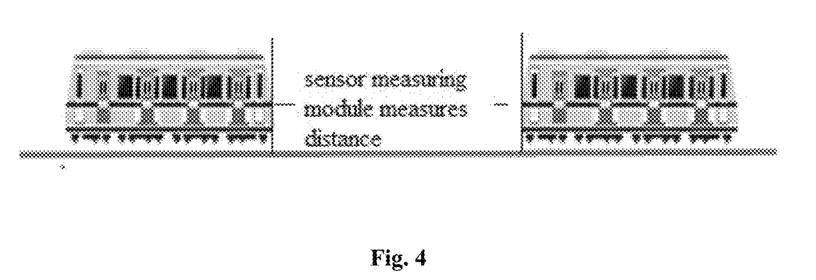
FIG. 4 shows a schematic diagram of a ranging method during a low-speed operation of trains provided by an embodiment of the present application.

Referring to FIG. 3, it may be understood that during inter-station operation, the speed of each train in the formation is relatively high, and correspondingly, the real-time distance between the trains is also relatively large in this case and is usually outside the effective measurement distance of the sensor measuring module, therefore in this case, information may be exchanged through the real-time communication between the trains, so as to calculate the real-time distance according to the position information of the current train and the previous adjacent train. Alternatively, referring to FIG. 4, in the case of formation establishment, formation outbound and formation inbound, etc., the speed of each train in the formation is relatively low, and correspondingly, the real-time distance between the trains is also relatively small in these cases and is usually inside the effective measurement distance of the sensor measuring module, therefore in these cases, the real-time distance can be measured directly through the sensor measuring module in the anti-collision apparatus. In sum, the real-time distance between the current train and the previous adjacent train may be determined by different methods according to the speed of the trains.

Further, on the basis of the above method embodiments, electromagnetic braking may be performed under a condition that the real-time distance between the trains is less than the preset minimum safety distance, and correspondingly, the process of the above step S103 may be as follows: sending a message for performing electromagnetic braking to the previous adjacent train, so that the previous adjacent train energizes an electromagnet at a rear of the previous adjacent train; and energizing an electromagnet at a front of the current train, so that the electromagnet at the front of the current train and the electromagnet at the rear of the previous adjacent train generate magnetic fields with a same polarity to control the current train to perform electromagnetic braking.

Figure 5:
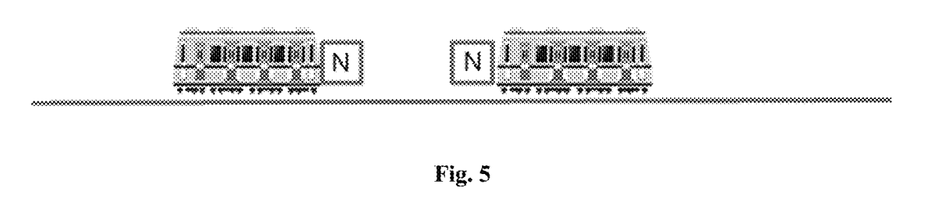
FIG. 5 shows an schematic diagram of arrangement of electromagnets provided by an embodiment of the present application.

In the implementation, electromagnets may be installed at the rear of the first train and the front of other trains in the formation, as shown in FIG. 5 (in which the "N" at the rear of the left train and the front of the right train represent the electromagnets with a same polarity at the rear of the previous adjacent train and the front of the current train). During electromagnetic braking, the electromagnets may be energized to generate electromagnetic force with a same polarity by the current train and the previous adjacent train. Specifically, when performing electromagnetic braking for the current train, a message for performing electromagnetic braking may be sent to the previous adjacent train, so that both the current train and the previous adjacent train can generate a direct current (such as, greater than 5000 A) through the current generator and rectifier of the trains, and transmit the direct current to the electromagnet coil and close the switch of the electromagnet coil to energize the electromagnet coil, therefore the electromagnet at the front of the current train and the electromagnet at the rear of the previous adjacent train generate magnetic fields with a same polarity to control the current train to brake through the strong repulsive force between the magnetic fields with the same polarity. In this way, the distance between the current train and the previous adjacent train can be increased in a short period of time to achieve short-distance protection and further avoid collision between the current train and the previous adjacent train, the operation capability is further improved.

Further, on the basis of the above method embodiments, the current train can be controlled to brake with a greater braking acceleration than that of the previous adjacent train, and correspondingly, a part of the process of the above step S104 may be as follows: obtaining a braking acceleration of the previous adjacent train, determining a target braking acceleration of the current train based on the braking acceleration and a preset braking acceleration increase, and controlling the current train to brake according to the target braking acceleration.

Herein, the preset braking acceleration increase may be understood as a preset difference between the braking acceleration of the current train and the braking acceleration of the previous adjacent train when the current train performs emergency braking, that is, the braking acceleration of the current train may be the sum of the braking acceleration of the previous adjacent train and the preset difference.

The target braking acceleration refers to the acceleration by which the current train brakes.

In the implementation, when the current train brakes, emergency braking information of the previous adjacent train, such as the braking acceleration, can be obtained through multi-methods redundancy such as the 5G, LiFi and image recognition technology (for example, the three methods may be provided with different priorities, and the method with a higher priority is used to implement the real-time communication between the trains). Then, the target braking acceleration of the current train can be determined in combination with the braking acceleration and the preset braking acceleration increase, and the current train is controlled to brake according to the target braking acceleration. For example, the braking acceleration of the previous adjacent train is 1.2 m/s$^2$ and the preset braking acceleration increase is 0.4 m/s$^2$, the target braking acceleration of the current train can be determined as 1.6 m/s$^2$. In this way, the real-time communication between the trains is achieved through multi-methods redundancy, and the real-time operation information of the previous adjacent train (such as the above emergency braking information) can be obtained faster and more accurately; moreover, the current train brakes by a greater braking acceleration than that of the previous adjacent train, the braking time and braking distance of the current train can be shortened, which can further avoid train collision and reduce train rear-end collision, and further improve the operation capability.

Further, on the basis of the above method embodiments, the real-time safety distance may be calculated based on different information according to different real-time distances, and correspondingly, a part of the process of the above step S104 may be as follows: under a condition that the real-time distance is less than a second preset maximum safety distance, measuring a relative speed between the current train and the previous adjacent train, and calculating the real-time safety distance based on the relative speed; and under a condition that the real-time distance is greater than the second preset maximum safety distance, calculating the real-time safety distance based on the speed of the previous adjacent train in the real-time operation information, a speed of the current train and a communication delay.

Herein, the second preset maximum safety distance refers to a distance set according to the effective measurement distance of the sensor measuring module, that is, if the real-time distance between the current train and the previous adjacent train is greater than this distance, the real-time safety distance is calculated according to the real-time operation information exchanged between the trains and the communication delay; and if the real-time distance between the current train and the previous adjacent train is less than this distance, the real-time safety distance is calculated according to the relative speed measured by the sensor measuring module.

In the implementation, in calculating the real-time safety distance between the current train and the previous adjacent train, it may be first determined whether the real-time distance between the current train and the previous adjacent train is less than the second preset maximum safety distance. Under a condition that the real-time distance between the current train and the previous adjacent train is less than the second preset maximum safety distance, the relative speed between the current train and the previous adjacent train can be measured (for example, using millimeter wave radar technology), and then the real-time safety distance between the current train and the previous adjacent train can be calculated based on the relative speed. Under a condition that the real-time distance between the current train and the previous adjacent train is greater than the second preset maximum safety distance, the real-time safety distance between the current train and the previous adjacent train can be calculated based on the real-time speed of the previous adjacent train in the real-time operation information of the previous adjacent train, the real-time speed of the current train, and the communication delay between the current train and the previous adjacent train. In this way, with the real-time communication between the trains, information are shared between the trains to more accurately calculate, based on the more accurate real-time information of the trains, the real-time safety distance between the current train and the previous adjacent train, so that the braking timing and braking manner for the current train are more suitable to the actual situation, which can more effectively avoid train collision and further improve the operation capability.

Figure 6:
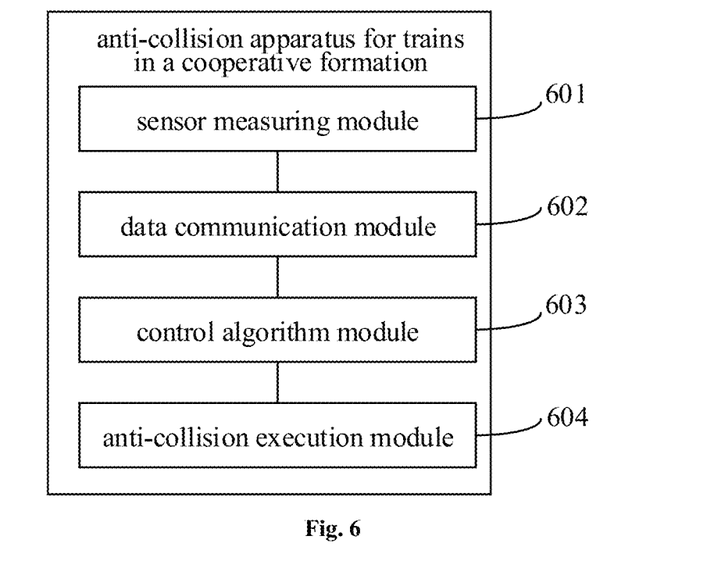
FIG. 6 shows a schematic structural diagram of an anti-collision apparatus for trains in a cooperative formation provided by an embodiment of the present application.

FIG. 6 shows an anti-collision apparatus for trains in a cooperative formation provided by an embodiment of the present application, including a sensor measuring module 601, a data communication module 602, a control algorithm module 603 and an anti-collision execution module 604, in which:

the sensor measuring module 601 is configured to measure a real-time distance between a current train and a previous adjacent train in the same formation as the current train;

the data communication module 602 is configured to implement real-time communication between the previous adjacent train and the current train;

the control algorithm module 603 is configured to determine whether it is necessary to control the current train to brake; determine whether the real-time distance between the current train and the previous adjacent train in the same formation as the current train is greater than a preset minimum safety distance; and calculate a real-time safety distance between the current train and the previous adjacent train; and the anti-collision execution module 604 is configured to control the current train to perform electromagnetic braking; or control, under a condition that the real-time distance is less than the real-time safety distance, the current train to brake.

Optionally, the control algorithm module 603 is further configured to:

under a condition that the previous adjacent train in the same formation as the current train brakes urgently, determine that it is necessary to control the current train to brake; or under a condition that the real-time distance between the current train and the previous adjacent train in the same formation as the current train determined by ranging is less than a first preset maximum safety distance, determine that it is necessary to control the current train to brake.

Optionally, the data communication module 602 is further configured to:

obtain real-time operation information of the previous adjacent train, in which the real-time operation information includes at least a speed of the previous adjacent train and position information of the previous adjacent train;

the control algorithm module 603 is further configured to:

calculate, based on the position information of the previous adjacent train in the real-time operation information and position information of the current train, the real-time distance between the current train and the previous adjacent train; or the sensor measuring module 601 is further configured to:

measure the real-time distance between the current train and the previous adjacent train, in which a method for measuring the real-time distance includes at least one or both of laser radar and ultra wide band technology.

Optionally, the anti-collision execution module 604 includes an electromagnetic anti-collision component configured to:

send a message for performing electromagnetic braking to the previous adjacent train, so that the previous adjacent train energizes an electromagnet at a rear of the previous adjacent train; and energize an electromagnet at a front of the current train, so that the electromagnet at the front of the current train and the electromagnet at the rear of the previous adjacent train generate magnetic fields with a same polarity to control the current train to perform electromagnetic braking.

Optionally, the data communication module 602 is further configured to:

obtain a braking acceleration of the previous adjacent train;

the anti-collision execution module 604 further includes a short-distance algorithm control component configured to:

determine a target braking acceleration of the current train based on the braking acceleration and a preset braking acceleration increase, and control the current train to brake according to the target braking acceleration.

Optionally, the control algorithm module 603 is further configured to:

under a condition that the real-time distance is less than a second preset maximum safety distance, measure a relative speed between the current train and the previous adjacent train, and calculate the real-time safety distance based on the relative speed; and under a condition that the real-time distance is greater than the second preset maximum safety distance, calculate the real-time safety distance based on the speed of the previous adjacent train in the real-time operation information, a speed of the current train and a communication delay.

The anti-collision apparatus for trains in a cooperative formation in the embodiment may be configured to implement the above method embodiments, and the principles and technical effects thereof are similar, which are not repeated herein.

Figure 7:
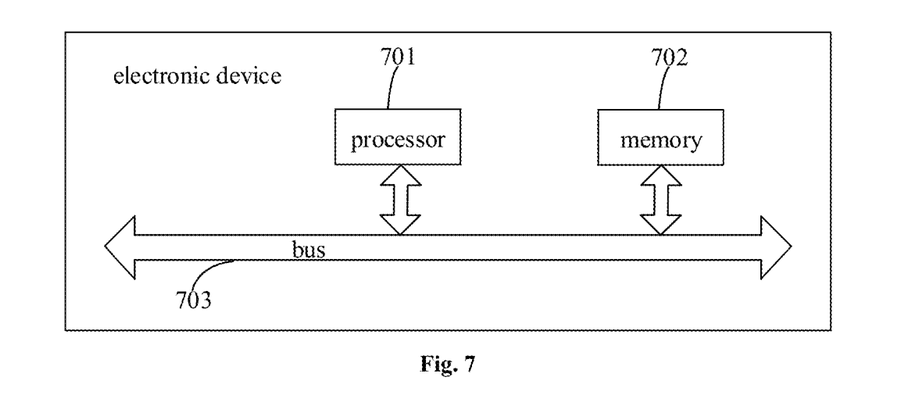
FIG. 7 shows a logical block diagram of an electronic device provided by an embodiment of the present application.

Referring to FIG. 7, the electronic device includes a processor 701, a memory 702 and a bus 703, in which:

the processor 701 and the memory 702 communicate with each other through the bus 703; and the processor 701 is configured to call program instructions in the memory 702 to perform the methods provided by the above method embodiments.

The embodiment provides a computer program product including a computer program stored on a non-transitory computer-readable storage medium, the computer program includes program instructions, and a computer, when executing the program instructions, performs the methods provided by the above method embodiments.

The embodiment provides a non-transitory computer-readable storage medium storing computer instructions, which enable a computer to perform the methods provided by the above method embodiments.

The apparatus embodiments described above are merely illustrative, in which the units described as separate components may or may not be physically separated, and the components displayed as units may or may not be physical units, that is, they can be located in one place or distributed to a plurality of network units. Some or all of the modules can be selected according to actual needs to achieve the objectives of the technical solutions of the embodiments. Those of ordinary skill in the art can understand and implement the embodiments without creative work.

With the above description of the implementations, those skilled in the art can clearly understand that each implementation can be implemented by means of software together with necessary general hardware platforms, and of course, each implementation can also be implemented by hardware. With this understanding, the essential or the part that contributes to the prior art of the above technical solutions can be embodied in the form of a software product which can be stored in a computer-readable storage medium, such as ROM/RAM, diskettes, an optical disc, and includes several instructions configured to enable a computer device (which may be a personal computer, a server, or a network device, etc.) to perform the methods described in each embodiment or some parts of the embodiments.

It should be noted that the above embodiments are only used to illustrate the technical solutions of the present application, rather than to limit them. Although the present application has been described in detail with reference to the foregoing embodiments, those of ordinary skill in the art should understand that the technical solutions described in the foregoing embodiments can be modified or some of the technical features thereof can be equivalently replaced, and these modifications or replacements do not cause the essential of the corresponding technical solutions to deviate from the gist and scope of the technical solutions of the various embodiments of the present application.

What is claimed is:

1. An anti-collision method for trains in a cooperative formation, comprising:

determining, under a condition that a current train is not a first train in the formation, whether it is necessary to control the current train to brake;

determining, under a condition that it is necessary to control the current train to brake, whether a real-time distance between the current train and a previous adjacent train in the same formation as the current train is greater than a preset minimum safety distance;

controlling, under a condition that the real-time distance is less than the preset minimum safety distance, the current train to perform electromagnetic braking; and calculating, under a condition that the real-time distance is greater than the preset minimum safety distance, a real-time safety distance between the current train and the previous adjacent train, and controlling, under a condition that the real-time distance is less than the real-time safety distance, the current train to brake;

wherein the determining whether it is necessary to control the current train to brake comprises:

under a condition that the previous adjacent train in the same formation as the current train brakes urgently, determining that it is necessary to control the current train to brake; or under a condition that the real-time distance between the current train and the previous adjacent train in the same formation as the current train determined by ranging is less than a first preset maximum safety distance, determining that it is necessary to control the current train to brake;

wherein the real-time distance between the current train and the previous adjacent train in the same formation as the current train determined by ranging is determined by:

obtaining real-time operation information of the previous adjacent train, wherein the real-time operation information comprises at least a speed of the previous adjacent train and position information of the previous adjacent train;

calculating, based on the position information of the previous adjacent train in the real-time operation information and position information of the current train, the real-time distance between the current train and the previous adjacent train; or measuring the real-time distance between the current train and the previous adjacent train, wherein a method for measuring the real-time distance comprises at least one or both of laser radar and ultra wide band technology;

wherein the calculating the real-time safety distance between the current train and the previous adjacent train comprises:

under a condition that the real-time distance is less than a second preset maximum safety distance, measuring a relative speed between the current train and the previous adjacent train, and calculating the real-time safety distance based on the relative speed; and under a condition that the real-time distance is greater than the second preset maximum safety distance, calculating the real-time safety distance based on the speed of the previous adjacent train in the real-time operation information, a speed of the current train and a communication delay.

2. The anti-collision method of claim 1, wherein the controlling the current train to perform electromagnetic braking comprises:

sending a message for performing electromagnetic braking to the previous adjacent train, so that the previous adjacent train energizes an electromagnet at a rear of the previous adjacent train; and energizing an electromagnet at a front of the current train, so that the electromagnet at the front of the current train and the electromagnet at the rear of the previous adjacent train generate magnetic fields with a same polarity to control the current train to perform electromagnetic braking.

3. The anti-collision method of claim 1, wherein the controlling the current train to brake comprises:
obtaining a braking acceleration of the previous adjacent train, determining a target braking acceleration of the current train based on the braking acceleration and a preset braking acceleration increase, and controlling the current train to brake according to the target braking acceleration.

4. A non-transitory computer-readable storage medium storing a computer program thereon, wherein the computer program implements, when executed by a processor, the anti-collision method of claim 1.

5. An anti-collision apparatus for trains in a cooperative formation, comprising a sensor measuring module, a data communication module, a control algorithm module and an anti-collision execution module, wherein:
the sensor measuring module is configured to measure a real-time distance between a current train and a previous adjacent train in the same formation as the current train;
the data communication module is configured to implement real-time communication between the previous adjacent train and the current train;
the control algorithm module is configured to determine whether it is necessary to control the current train to brake; determine whether the real-time distance between the current train and the previous adjacent train in the same formation as the current train is greater than a preset minimum safety distance; and calculate a real-time safety distance between the current train and the previous adjacent train; and
the anti-collision execution module is configured to control the current train to perform electromagnetic braking; or control, under a condition that the real-time distance is less than the real-time safety distance, the current train to brake;
wherein the control algorithm module is further configured to:
under a condition that the previous adjacent train in the same formation as the current train brakes urgently, determine that it is necessary to control the current train to brake; or
under a condition that the real-time distance between the current train and the previous adjacent train in the same formation as the current train determined by ranging is less than a first preset maximum safety distance, determine that it is necessary to control the current train to brake;
wherein the data communication module is further configured to:
obtain real-time operation information of the previous adjacent train, wherein the real-time operation information comprises at least a speed of the previous adjacent train and position information of the previous adjacent train;
the control algorithm module is further configured to:
calculate, based on the position information of the previous adjacent train in the real-time operation information and position information of the current train, the real-time distance between the current train and the previous adjacent train; or
the sensor measuring module is further configured to:
measure the real-time distance between the current train and the previous adjacent train, wherein a method for measuring the real-time distance comprises at least one or both of laser radar and ultra wide band technology;

wherein the control algorithm module is further configured to:
under a condition that the real-time distance is less than a second preset maximum safety distance, measure a relative speed between the current train and the previous adjacent train, and calculate the real-time safety distance based on the relative speed; and
under a condition that the real-time distance is greater than the second preset maximum safety distance, calculate the real-time safety distance based on the speed of the previous adjacent train in the real-time operation information, a speed of the current train and a communication delay.

6. The anti-collision apparatus of claim 5, wherein the anti-collision execution module comprises an electromagnetic anti-collision component configured to:
send a message for performing electromagnetic braking to the previous adjacent train, so that the previous adjacent train energizes an electromagnet at a rear of the previous adjacent train; and
energize an electromagnet at a front of the current train, so that the electromagnet at the front of the current train and the electromagnet at the rear of the previous adjacent train generate magnetic fields with a same polarity to control the current train to perform electromagnetic braking.

7. The anti-collision apparatus of claim 5, wherein the data communication module is further configured to:
obtain a braking acceleration of the previous adjacent train;
the anti-collision execution module further comprises a short-distance algorithm control component configured to:
determine a target braking acceleration of the current train based on the braking acceleration and a preset braking acceleration increase, and control the current train to brake according to the target braking acceleration.

8. An anti-collision system for trains in a cooperative formation, comprising a memory storing a computer program, and a processor coupled to the memory, wherein the processor is configured to execute the computer program to perform operations of:
determining, under a condition that a current train is not a first train in a formation, whether it is necessary to control the current train to brake;
determining, under a condition that it is necessary to control the current train to brake, whether a real-time distance between the current train and a previous adjacent train in the same formation as the current train is greater than a preset minimum safety distance;
controlling, under a condition that the real-time distance is less than the preset minimum safety distance, the current train to perform electromagnetic braking; and
calculating, under a condition that the real-time distance is greater than the preset minimum safety distance, a real-time safety distance between the current train and the previous adjacent train, and controlling, under a condition that the real-time distance is less than the real-time safety distance, the current train to brake;
wherein the determining whether it is necessary to control the current train to brake comprises:
under a condition that the previous adjacent train in the same formation as the current train brakes urgently, determining that it is necessary to control the current train to brake; or
under a condition that the real-time distance between the current train and the previous adjacent train in the same formation as the current train determined by ranging is less than a first preset maximum safety distance, determining that it is necessary to control the current train to brake;

wherein the real-time distance between the current train and the previous adjacent train in the same formation as the current train determined by ranging is determined by:

obtaining real-time operation information of the previous adjacent train, wherein the real-time operation information comprises at least a speed of the previous adjacent train and position information of the previous adjacent train;

calculating, based on the position information of the previous adjacent train in the real-time operation information and position information of the current train, the real-time distance between the current train and the previous adjacent train; or   measuring the real-time distance between the current train and the previous adjacent train, wherein a method for measuring the real-time distance comprises at least one or both of laser radar and ultra wide band technology;

wherein the calculating the real-time safety distance between the current train and the previous adjacent train comprises:

under a condition that the real-time distance is less than a second preset maximum safety distance, measuring a relative speed between the current train and the previous adjacent train, and calculating the real-time safety distance based on the relative speed; and   under a condition that the real-time distance is greater than the second preset maximum safety distance, calculating the real-time safety distance based on the speed of the previous adjacent train in the real-time operation information, a speed of the current train and a communication delay.

\* \* \* \* \*